United States Patent [19]

Boyd

[11] Patent Number: 4,899,544
[45] Date of Patent: Feb. 13, 1990

[54] COGENERATION/$CO_2$ PRODUCTION PROCESS AND PLANT

[76] Inventor: Randall T. Boyd, 2639 Cooper's Post La., Sugarland, Tex. 77478

[21] Appl. No.: 355,894

[22] Filed: May 19, 1989

Related U.S. Application Data

[63] Continuation of Ser. No. 84,847, Aug. 13, 1987, abandoned, which is a continuation-in-part of Ser. No. 860,914, May 8, 1986, abandoned.

[51] Int. Cl.$^4$ .................................................. F01K 23/10
[52] U.S. Cl. ........................................ 60/618; 60/721
[58] Field of Search ................ 60/616, 618, 648, 649, 60/670, 39.182, 721

[56] References Cited

U.S. PATENT DOCUMENTS

| | | | |
|---|---|---|---|
| 3,000,707 | 9/1961 | Barstow | 60/301 X |
| 3,232,885 | 2/1966 | Henke | 60/301 X |
| 3,350,876 | 11/1967 | Johnson | 60/618 |
| 3,628,332 | 12/1971 | Kennar | 60/648 X |
| 3,930,367 | 1/1976 | Gasparoli | 60/39.182 |
| 4,031,705 | 6/1977 | Berg | 60/618 X |
| 4,182,127 | 1/1980 | Johnson | 60/618 |
| 4,257,223 | 3/1981 | Enga | 60/39.182 X |

Primary Examiner—Allen M. Ostrager
Attorney, Agent, or Firm—Dodge Bush & Moseley

[57] ABSTRACT

In accordance with an illustrative embodiment of the present invention, a cogeneration facility combined with means for producing $CO_2$ includes an internal combustion engine that drives an electrical generator, a waste heat recovery unit through which hot exhaust gases from the engine are passed to recover thermal energy in usable form, and means for conveying exhaust gases coming out of the waste heat recovery unit to a $CO_2$ recovery unit where the $CO_2$ is extracted and made available as a saleable byproduct.

29 Claims, 4 Drawing Sheets

COGENERATION/CO₂ PRODUCTION PROCESS AND PLANT

This application is a continuation of application Ser. No. 084,847, filed Aug. 13, 1987, now abandoned, which is a continuation-in-part of application Ser. No. 860,914 filed May 8, 1986 now abandoned.

FIELD OF THE INVENTION

This invention relates generally to separation and recovery of carbon dioxide from the exhaust gases of a prime mover that powers an electrical generator, and particularly to the addition of a $CO_2$ recovery phase to existing systems of power generation where electricity is produced and heat is recovered. In accordance with the invention a $CO_2$ production plant can be installed at a user's facility in an economically feasible manner that heretofore has not been possible.

BACKGROUND OF THE INVENTION

Most any facility that produces electric power by a generator driven by an internal combustion engine also produces a supply of $CO_2$ that usually is vented to the atmosphere and discarded. The $CO_2$ supply is contained in the exhaust gases produced by the engine, along with other components such as water, nitrogen, and oxygen. However, there is an ever increasing need for $CO_2$ in tertiary or enhanced oil recovery operations and well stimulation, and in food processing and beverage bottling, to name but a few industrial uses. In addition, for a number of years now, public attention has been focused upon air quality through clean-up of emissions of exhaust gases. However most efforts have involved the installation of expensive technology that has increased the overall cost of the equipment and its operation, without producing any by-product considered to be of value. The increasing demand for $CO_2$ along with increasing environmental pressure to reduce emissions has produced a long-felt need to which the present invention is directed.

Carbon dioxide in quantities sufficiently large enough for commercial exploitation generally has come from three sources. One such source is the naturally occurring underground supply of carbon dioxide in areas such as Colorado, Wyoming, Mississippi, and other areas. A second source is that resulting from by-products of the operation of a primary process, such as the manufacture of ammonia or a hydrogen reformer. A third source is found in the exhaust gases from burning of various hydrocarbon fuels. One of the largest problems that is faced by carbon dioxide users is the problem of transportation from the place of production to the point of use. Of the three sources discussed above, applicant believes that only the last mentioned source provides the flexibility of supplying carbon dioxide close to the demand, thereby eliminating the transportation problem. The present invention also embodies economic advantages under current Federal laws such as the Public Utilities Regulatory Policies Act of 1978 (PURPA), because the facility can be a qualified cogeneration system combined with a means to recover useful amounts of carbon dioxide from the exhaust gas of the cogeneration prime mover. The invention operates to cause a sizable reduction in exhaust pollutants, and thus represents a major advance in the efficient use of a valuable natural resource, hydrocarbon fuel. The present invention also contemplates the use of an efficient, oxygen tolerant solvent in the recovery of carbon dioxide from the exhaust gas of a prime mover.

By far the largest contributor to $CO_2$ demand is enhanced oil recovery (EOR) processes and systems. The EOR market, while heavily influenced by the price of oil, is not entirely dependent upon it. As an oil field is depleted, there is an optimum point at which EOR techniques should be applied, and hence there is an incentive to use EOR even when oil prices are low. It has been projected that carbon dioxide from natural sources can fill only a small percentage (about 13%) of projected demand. The remaining demand must be met by other sources, such as the recovery of $CO_2$ from exhaust gas streams according to this invention. There are literally hundreds of viable EOR projects in areas of the U.S. and Canada where natural sources of $CO_2$ are not available. The present invention offers an effective and economical method of providing electricity to oil fields, as well as electricity, steam and exhaust gas to the separation plant. With this arrangement, $CO_2$ can be produced at very low cost, particularly where the prime mover is fueled by natural gas which exists at the same location.

The largest non-oil field use for $CO_2$ is in connection with refrigeration of quick frozen meats and vegetables, and the refrigeration of foods for storage and transportation. Both liquid $CO_2$ and solid $CO_2$ (dry ice) are used for these purposes. Another large non-oil field use of $CO_2$ is for beverage carbonation, which is a growing market. The present invention has application to these markets as well.

There are a number of alternatives presently available for recovering $CO_2$ from dilute, low pressure, oxygen-bearing streams. The more common techniques require compression of the gas to at least 100 psi and then removing all the oxygen. In order to accommodate the dilute $CO_2$ concentration in the exhaust gas stream, high solvent concentrations have been required. High circulation rates are costly, and high solvent concentrations require corrosion protection and increased material costs for plant construction. Thus the use of certain solvents has not been economically competitive, and previous process designs have been capable of absorbing up to only about 75% of the available $CO_2$ in the exhaust gas. The present invention contemplates the use of a solvent that enables recovery of in excess of 90% of the available $CO_2$ without removing the oxygen and without compressing the exhaust gas above the pressure required to pass it through the absorption stage.

Applicant has discovered that a solvent sold under the trade designation "GAS/SPEC FT" by the Dow Chemical Company, Midland, Mich., has characteristics that permit it to carry what would normally be prohibitive levels of $CO_2$ without causing high metal corrosion rates or solvent degradation. In the past, vapor spaces have been left unprotected when inhibitors are used. However with use of the solvent identified above, the vapor offers the same level of corrosion protection as that in the liquid circuit. Corrosion is so minimized that carbon steel can be used in most parts of the plant. No special handling is necessary to remove or to limit the amount of oxygen that enters the plant, which eliminates or reduces the capital requirements of installation of oxygen removal equipment. Thus the use of the enhanced solvent permits a sharp reduction in capital investment due to lower circulation rates (allows smaller plant), and corrosion protection that permits carbon steel to be used instead of more expensive stainless steels. With these advantages, a larger regenerator can be built for the same cost and efficiency as would otherwise be possible. Numerous other advantages are realized in the way of operating cost savings, less energy requirements due to reduced heat energy needs, solvent cost reduction, and lower maintenance costs. The present invention is particularly applicable to an engine-generator set that has an exhaust gas stream containing $CO_2$, and which produces electrical power for running pumps, blowers, and compressors, and which produces heat energy that is used in the $CO_2$ separation phase.

Those familiar with the art will recognize that in 1978, Congress passed the Public Utility Regulatory Policies Act (PURPA). This law requires that a public utility purchase electrical power from a "qualified facility" at that facility's "avoided cost". To receive qualified facility status, a specified portion of the available thermal energy resulting from the generation of electric power must be used in another process rather than wasted. Avoided cost is defined as the price the utility must pay on the market for purchased power to satisfy any demand which exceeds its own generating capacity. If enough of the waste heat is converted to usable energy, the unit will qualify as a "cogeneration" facility under PURPA.

There are a number of benefits that are associated with being classified as a cogeneration facility. In addition to tax credits and accelerated depreciation benefits, a public utility must purchase the power generated in a cogeneration plant, and must allow connection to their power transmission network. Other benefits have to do with the fact that a cogeneration facility is exempt from most State and Federal laws regulating public utilities.

From the foregoing it will be recognized that the present invention, which may be considered to be a trigeneration process, can generate power, extract carbon dioxide, and use the heat energy produced to activate the recovery process to recover valuable $CO_2$ which would otherwise be wasted. Prior systems have been deficient because they were energy intensive, required expensive corrosion resistant materials, were uneconomical, polluted the atmosphere, and required significant capital investment. Applicant's recognition of the need to provide a source of $CO_2$ at the location of need and use lead to the making of the present invention.

It is therefore an object of the present invention to prove a new and improved process and plant for $CO_2$ generation where the above-described disadvantages in the prior art are diminished or eliminated altogether.

Another object of the present invention is to provide a new and improved $CO_2$ production plant at the user's location.

Another object of the present invention is to provide a new and improved $CO_2$ production process and plant including a prime mover that employs hydrocarbon fuel to drive an electric generator.

Another object of the present invention is to provide a new and improved $CO_2$ recovery process that employs an absorbing solvent for extracting $CO_2$ from an exhaust gas stream, such solvent having high $CO_2$ carry capacity and low corrosiveness.

Another object of the present invention is to provide a new and improved $CO_2$ production plant with modular installation and which is readily transportable.

Yet another object of the present invention is to provide a plant and process of the type described wherein solvent waste products can be disposed of by non-polluting incineration.

SUMMARY OF THE INVENTION

This and other objects of the present invention are attained through the use of a unique process including the steps of driving an electric generator with an engine or turbine that uses a hydrocarbon fuel, for example natural gas, coal gas, diesel oil, and the like, and air as the internal combustion medium. The heat generated during this process by the engine, its accessories, and the hot exhaust from the engine or prime mover are recovered and used to generate steam to be used by a carbon dioxide separation process and for other plant purposes. The exhaust gases can be supplementarily fired in an exhaust gas heat exchanger to economically enhance the heat recovery steam output and to increase the concentration of $CO_2$, if required. The excess steam can be used as process steam and/or to drive a steam turbine to generate additional electric power.

The cooled exhaust gases are fed, in part, to clean-up scrubbers by a booster fan, if necessary, and then to a $CO_2$ recovery absorption tower. Only so much of the exhaust gas is fed to the recovery unit as is needed to produce the desired quantity of carbon dioxide. The remainder is exhausted to the atmosphere after clean up. For EOR, all of the $CO_2$ is recovered. The exhaust gases rise through the tower where they come in counter-current contact with the recovery solution into which the $CO_2$ is absorbed. The remainder of the clean exhaust gas is vented to atmosphere. The $CO_2$ enriched solution is drawn out of the bottom of the tower and fed to a stripper tower where the $CO_2$ is removed from the solution. The solvent solution is then recirculated through a heat exchanger and back to the absorber tower. The unique solvent has the additional property of being completely consumed by heat when its absorbing capability is ended, with no pollution. The $CO_2$ gas is then removed from the top of the stripper tower where it is scrubbed, compressed, dried, cooled and liquified. The liquid $CO_2$ is then stored in suitable containers or tanks. Alternatively, the liquified $CO_2$ can be fed directly to a pipe line to convey the same to an injection well of an oil well tertiary recovery system, or used in both liquid and gaseous form by a beverage or food processing installation. It also can be fed to a "dry ice" press and used for other chilling or food preservation purposes. Other and further uses also will be apparent.

BRIEF DESCRIPTION OF THE DRAWINGS

The present invention has other objects, features and advantages that will become more clearly apparent in connection with the following detailed description of preferred embodiments, taken in conjunction with the appended drawings in which.

DESCRIPTION OF A PREFERRED EMBODIMENT

Figure 1:
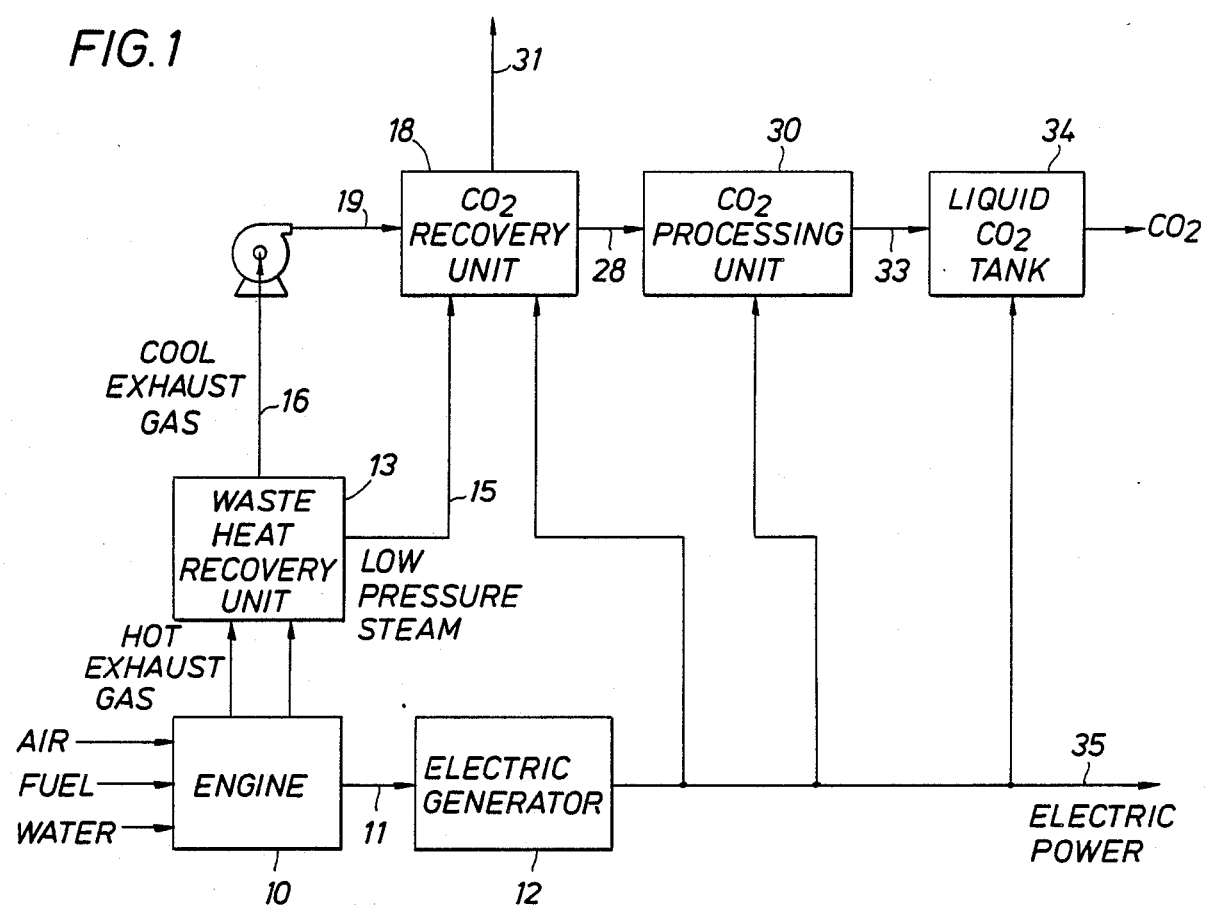
FIG. 1 is a schematic drawing in the nature of a flow diagram to illustrate the relationship among various components of the present invention.

Referring initially to FIG. 1, element 10 represents a prime mover such as an internal combustion engine that intakes a mixture of air and fuel and produces rotation of a shaft 11 that is coupled to an electric generator 12. The prime mover can also be a gas turbine, or a power boiler and steam turbine combination. Cooling water is also supplied to cool the engine and lubricating oil. The generator 12 is provided with appropriate switching gear and transformers of the type required to connect to a utility system. The exhaust manifold of the engine included in 10 can, if desired, be coupled to a catalytic converter of known design that removes certain undesirable oxides of nitrogen and carbon from the exhaust gases, and enriches the $CO_2$ content by converting carbon monoxide to carbon dioxide.

Hot exhaust gases from the engine manifold are fed through a waste heat recovery unit 13, which can include a typical heat exchanger in which preheated feed water from the engine cooling system is converted to low pressure steam in a line 15, or to hot water. Of course other heat transfer fluids could be used. The steam or hot water provides a recovery of thermal energy which is used in associated plant processes for heating or the like, and which qualifies the plant 10, 12 as a cogeneration facility as previously described.

Figure 2:
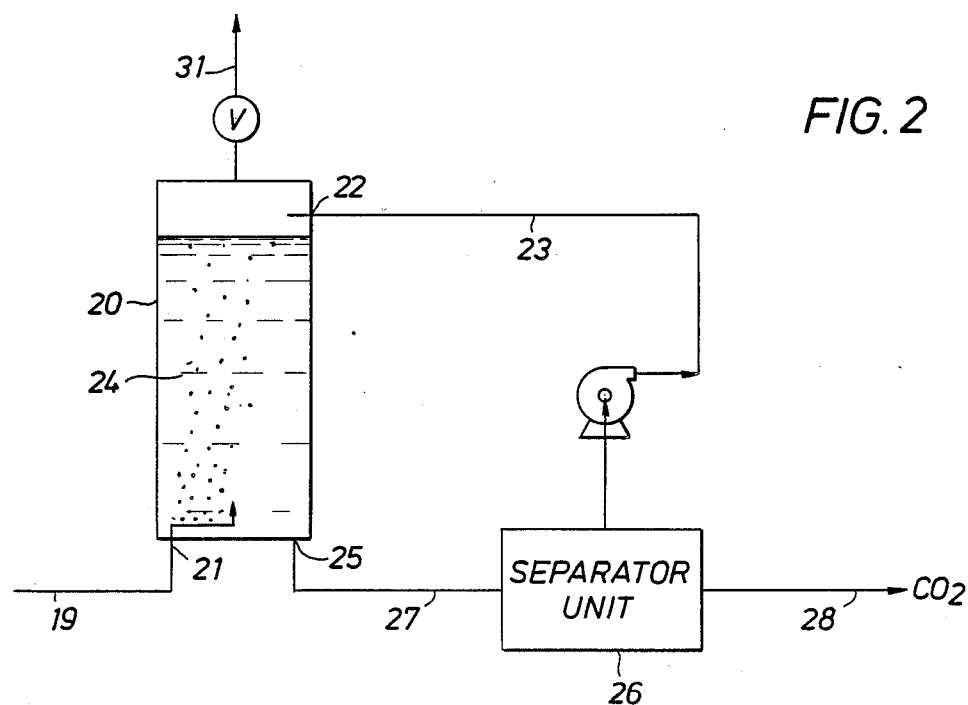
FIG. 2 is a schematic of a $CO_2$ recovery unit.

Cooled exhaust gases from the heat recovery unit 13 pass through a duct 16 where they are fed by a booster fan, for example an induced draft fan 17, to the input of a $CO_2$ recovery unit 18 via another duct 19. The unit 18 can be any one of various well known designs, one such unit being shown schematically in FIG. 2. An upright hollow vessel or tower 20 has a lower inlet 21 for the cool exhaust gas in duct 19, and an upper inlet 22 for recovery solution returning to the vessel 20 from line 23. The vessel 20 contains a column of suitable co-solvent recovery liquid 24, with which the exhaust gases come in countercurrent contact as shown in the drawing. $CO_2$ is absorbed in the solution, which then is drained out the vessel outlet 25 and piped to a separator 26 via a line 27. In the unit 26 the $CO_2$ is separated out and fed by a line 28 to a processing unit indicated generally at 30 in FIG. 1. The exhaust gases, now free of acid compounds, are vented to the atmosphere at 31.

The processing unit 30 is known in the art, and comprises scrubbers, a compressor, a dryer and a liquification system. Refrigeration of the $CO_2$ generally includes an ammonia or freon compressor, and an air-cooled condenser. There is no need of a supply of cooling water in this unit. Low pressure $CO_2$ at near ambient condition is scrubbed, precooled and compressed to about 300 psia, then aftercooled before entering the dryer where water is removed from the gas. Typically dryers are regenerated by the use of electric heaters. However, there is often excess waste heat available to regenerate the $CO_2$ dryers, which leaves more electric power for sale. The dry $CO_2$, is then chilled and condensed to a liquid and is fed via a line 33 to a storage tank 34 where it is stored at approximately 250 psia and $-10°$ F. Any vapors off the top of the storage tank can be vented or returned to the suction side of the $CO_2$ compressor when it is operating. Vapor recompression prevents product losses during storage.

$CO_2$ storage requirements depend entirely on the specific conditions of the user's site. For example, a continuous oil well injection project would require little or no storage, whereas a beverage bottler who operates on a five-day week would need several days storage capability. In the typical case, five to seven days of inventory, when the $CO_2$ unit of the present invention is operating at full capacity, is sufficient for most liquid operations. Food grade $CO_2$ may require purification equipment, such as an activated charcoal bed.

Instead of being stored, the $CO_2$ in line 33 can be piped directly to an injection well and pumped into the earth to enhance or stimulate oil production from adjacent wells by recharging the producing formation with a solution gas drive. The $CO_2$ also can be used directly in beverage bottling and food processing operations. It also can be refrigerated to form dry ice used in numerous food processing and refrigeration applications.

The electrical output of the generator 12 can be used to power the various motors that drive the pumps, compressors, and fans used in the present invention, and the low pressure steam from the waste heat recovery unit can be used elsewhere in the plant, for example, for heating. Excess electricity on power line 35 can be sold to a public utility through a suitable connection to their power transmission lines as permitted by law. The revenues gained by sale of excess electricity reduce the cost of power and additional emission control equipment.

Liquifying the entire stream of $CO_2$ on the line 28 may not be necessary, however $CO_2$ in liquid phase is believed to be the most economical state in which it may be transported. On the other hand a user may not require more than low pressure gas. In many cases, $CO_2$ customers have been paying for compression and refrigeration which is not needed.

An on-site $CO_2$ production plant in accordance with the present invention can be designed to produce the required pressure for the user's purpose, which can result in a manufacturing cost for $CO_2$ that is less than the wholesale price which that merchant had been paying in the past. On-site plants for oil producers also are attractive to those producers who do not have ready access to pipelines that are being built to carry naturally occurring $CO_2$ to the oil fields in major producing areas or basins. Such producers typically will have to pay premium prices for liquid $CO_2$ transported from a distant source.

The economic feasibility of the present invention is predicated upon the need or sale of carbon dioxide from the previously wasted exhaust of a cogenerating installation. If the cogeneration plant is economically justified because of the electric power costs alone, then the use or sale of the carbon dioxide, recovered in accordance with this invention, will make the installation very profitable. The magnitude of the economic advantage has been calculated to reduce the pay-back time period of a cogeneration installation to one third or less, and after pay-back to increase the plant's profits more than fourfold.

A cogeneration/$CO_2$ plant in accordance with this invention can be designed to be movable from site to site, thereby offering oil producers, for example, an opportunity to pilot flood a field using low cost $CO_2$, as opposed to paying the high costs of transporting liquid $CO_2$ to the site. When the pilot program is completed, the equipment can be moved to test another location, or duplicated to achieve the required $CO_2$ capacity for a particular well or group of wells. The present invention is particularly advantageous when well head gas is available, at little or no cost, to fuel the engine 10.

Many food processors and beverage manufacturers already have a power plant at their facilities. Then a waste heat recovery unit and a $CO_2$ production plant is all that would be required. The equipment required for moderate to small scale projects can be prefabricated, which lowers overall capital cost when compared to field erected systems.

Figure 3A:
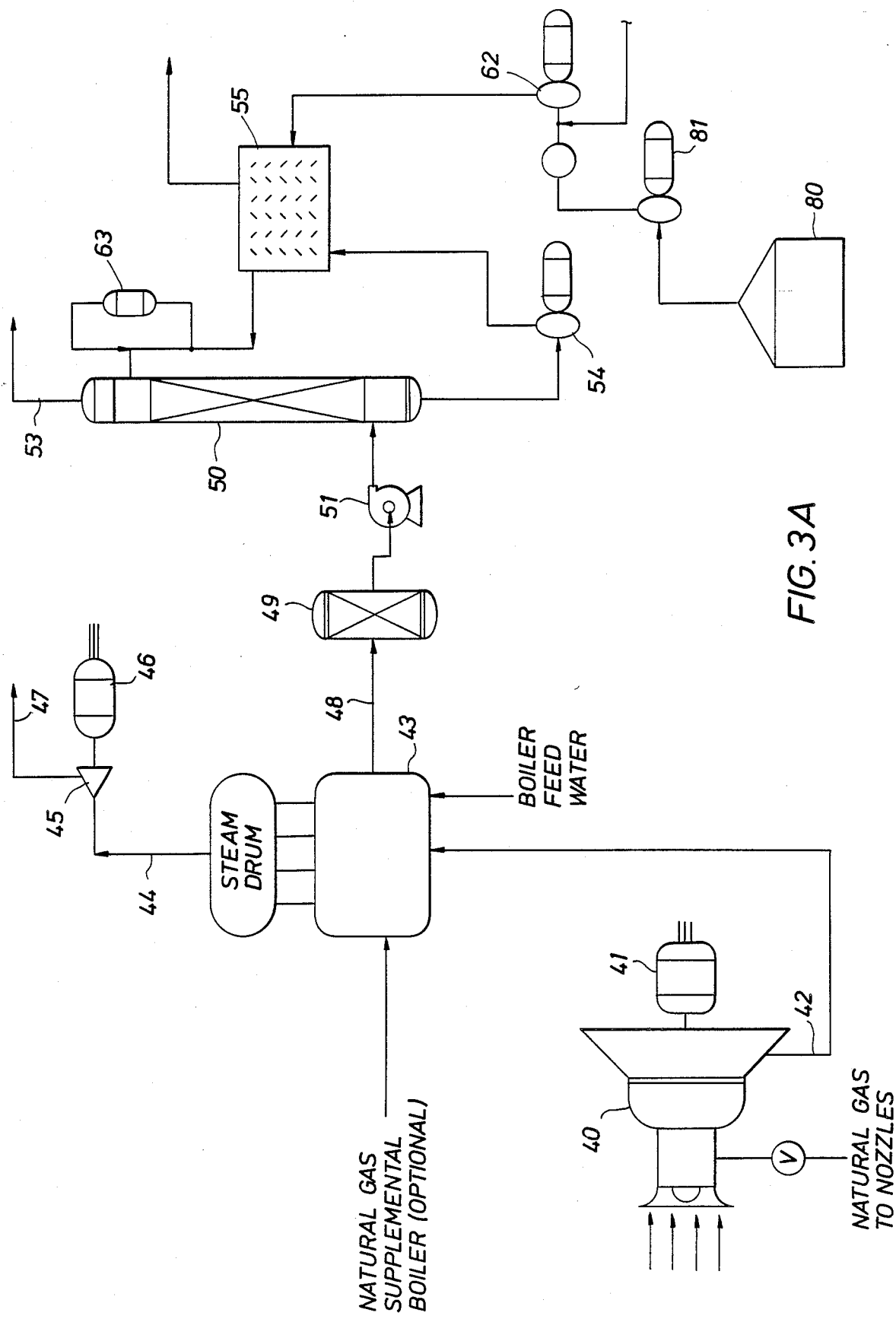
FIGS. 3A and 3B are schematic illustrations of a more detailed embodiment of the present invention, FIG. 3B being a right-side continuation of FIG. 3A.
Figure 3B:
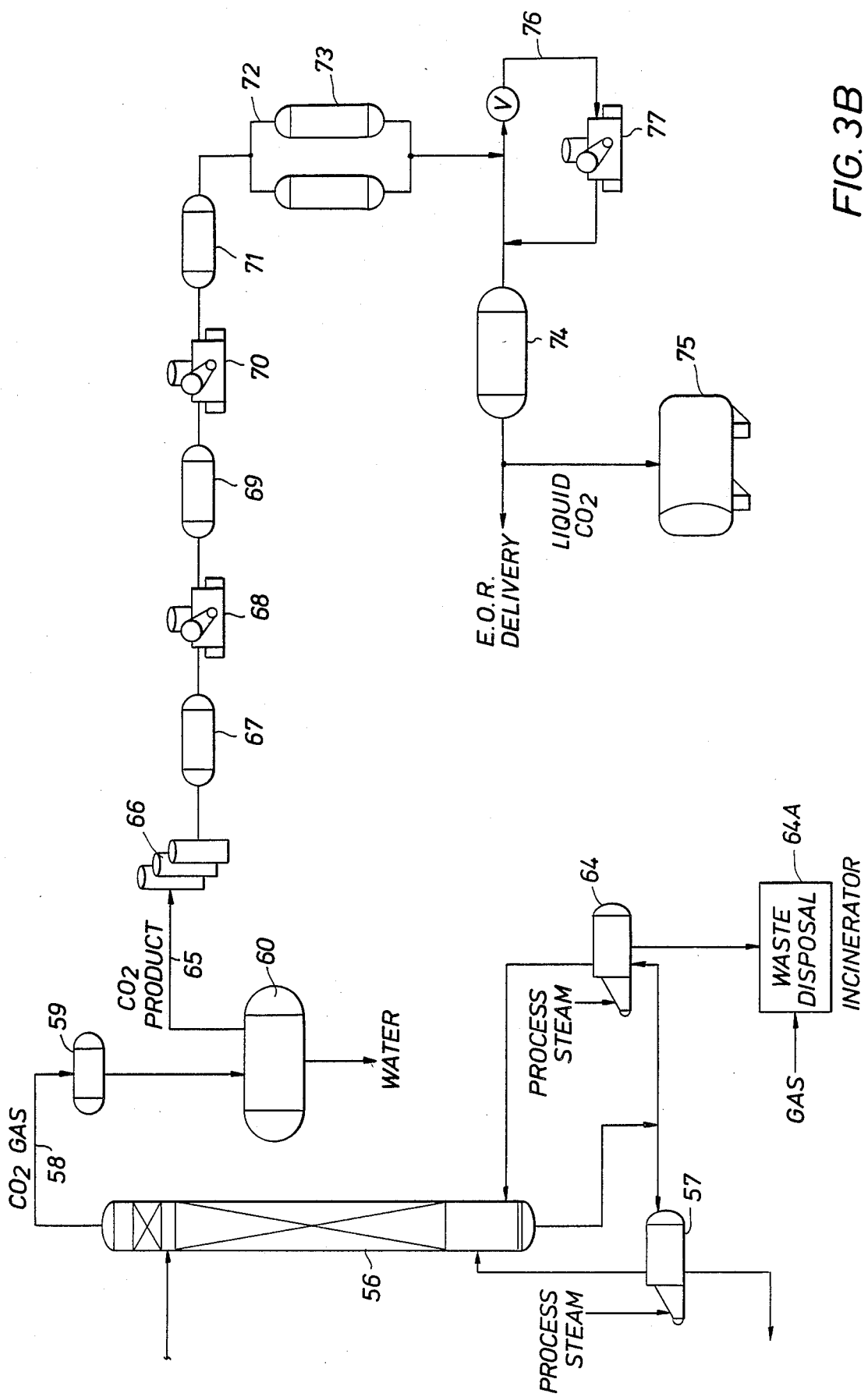

A more elaborate and detailed illustration of the present invention, including several additional components, is shown in FIGS. 3A and 3B. With reference to FIG. 3A, element 40 represents an internal combustion prime mover such as a power turbine that burns a mixture of air and hydrocarbon fuel to produce rotation of an electric generator 41. The generator 41 is provided with appropriate switching gear and transformers of the type required to connect to a utility system. The exhaust gases can be treated by catalytic converters or scrubbers or be supplementarily fired to remove undesirable elements and/or increase the concentration of the carbon dioxide prior to removal.

The exhaust gases in duct 42 from the turbine 40 first pass to a waste heat recovery boiler 43 where residual oxygen (15%) contained in the gas serves as secondary combustion air. Supplemental gas firing of the heat recovery boiler consumes most of the oxygen in the exhaust gas. Additional $CO_2$ is thus generated, but with a lower than proportional addition of nitrogen. As a result the exhaust gas is now richer in $CO_2$ than before. This is important because with a higher concentration, the size of the absorber vessel is reduced, less packing is needed and the circulation rates can be reduced along with associated energy savings. Steam is produced in line 44 from the waste heat recovery boiler 43 at about 400 psig and is used to drive a steam turbine 45 which rotates an electric generator 46. The steam from this unit is exhausted at 50 psig through line 47 and is used to provide process heat for the stripping tower reboiler and reclaimer to be described below. The exhaust gas at 250° F. from the flow through boiler 43 is routed via line 48 to a direct contact cooler 49 where it is cooled to about 115° F.

Flue gas from the cooler 49 which is at about ambient pressure is boosted several psig to overcome the pressure drop in the absorber 50 by an electrically driven blower 51. Enriched exhaust gas from the waste heat recovery boiler 43 and blower 51 enters the bottom of the absorber vessel 50 where it is quenched and countercurrently contacted with lean solvent. Packed beds are used throughout the absorber 50 to limit pressure drop. Lean gas, after absorption, is subjected to a water washer to recover valuable solvent vapor plus an entrainment. After this, the washed gas is vented at 53 to the atmosphere. Rich solvent from the absorber 50 is pumped by the rich solvent pump 54 to a lean/rich heat exchanger 55 where it is preheated by exchange of heat with the lean hot solution leaving the stripper 56 (FIG. 3B). The rich solvent, now heated to about 235° F., is routed to the top of the stripper 56 below its packed upper section.

As the rich solution passes down through the stripper 56, its temperature increases and $CO_2$ is released. At the bottom of the stripper 56, the lean solution passes through an external reboiler 57 to pick up the heat needed to remove the $CO_2$ from the rich solution. The reboiler is heated by 50 psig process steam. The steam and $CO_2$ enter the wash section at the top of the stripper where entrained solvent is removed. The steam and $CO_2$ then leave the stripper 56 via line 58 and enter the reflux condenser 59 where the steam is condensed and the $CO_2$ cooled. The mixture then enters the reflux drum 60 where the $CO_2$ is separated from the condensate.

The lean solvent solution leaves the reboiler 57 at about 250° F. and enters the lean/rich heat exchanger 55 through the lean solvent pump 62, where it is cooled to 143° F. Before returning to the absorber 50 for its next cycle, a ten percent side stream is removed and directed through a carbon bed filtering system 63 to remove many of the solution's contaminants. A reclaimer 64 is used in conjunction with the stripper to remove contaminants, such as heat stable salts and other compounds not removed by the carbon bed filtering system 63. The reclaimer 64 uses process steam from the waste heat recovery boiler 43 previously described. The discharge of $CO_2$ from the reflux drum 60 is product $CO_2$ in gaseous form at 120° F. and 16 to 19 psia. The solvent waste products are periodically vented to an incinerator 64A for disposal by burning.

The $CO_2$ product then is routed via line 65 to inlet scrubbers 66 to purify the product. From there it passes through an inlet cooler 67, is compressed by a booster compressor 68, cooled again by an intercooler 69 and compressed in high stage compressor 70 to about 300 psia and cooled again by an aftercooler 71. The compressed $CO_2$ is then routed through lines 72 to dryers 73 where moisture is removed. Following the dryers, the $CO_2$ is chilled and condensed in the condenser 74 to a liquid. It is then routed to a storage tank 75. An optional compression phase can be employed by routing the $CO_2$ via line 76 to high pressure compressors 77. The product is then condensed and delivered via line 78 at over 2000 psia for enhanced oil recovery.

Refrigeration of the compressed $CO_2$ generally includes an ammonia or Freon compressor and an air cooled condenser. Any $CO_2$ vapors from the top vent of the storage tank 75 are returned to the inlet side of the booster compressor 68 to prevent product losses during storage and/or delivery. Solvent makeup is stored in the solvent storage tank 80 (FIG. 3A) where makeup is entered into the system via the solvent makeup pump 81.

Carbon dioxide storage requirements at the site depend upon the intended use of the carbon dioxide product. If the carbon dioxide is transported for EOR via pipeline, or used in-house by a food or beverage processor, little or no storage is required. If the product is to be wholesaled or retailed by truck or rail tank car, then several storage tanks will be required.

Instead of being stored, the $CO_2$ can be compressed to approximately 2000 psig and piped directly to an injection well and pumped into the earth to enhance or stimulate oil production from adjacent wells by recharging the producing formation with a solution gas drive. The $CO_2$ also can be used directly at lower pressure in beverage bottling and food processing operations. It can also be compressed to form dry ice used in numerous food processing and refrigeration applications.

The electrical output of the generator 41 can be used to power the various motors that drive the pumps, compressors, and fans used in the present invention, and the low pressure steam from the waste heat recovery unit 43 can be used elsewhere in the plant, for example, for heating. Excess electricity can be sold to a public utility through a suitable connection to their power transmission lines as permitted by law. The revenues gained by sale of excess electricity reduces the cost of power and additional emission control equipment.

Liquifying the entire stream of $CO_2$ on the line may not be necessary, however, $CO_2$ in liquid phase is believed to be the most economical state in which it may be transported. On the other hand a user may not require more than low pressure gas. In many cases, $CO_2$ customers have been paying for compression and refrigeration which is not needed.

A cogeneration/carbon dioxide plant in accordance with this invention can be mounted on a platform with skids designed to be movable from site to site as indicated earlier. This provides a great opportunity for oil producers to position the plant where it is needed and to move it when its need is over. The economics becomes more attractive if well head gas is available at the location.

Similarly, food processors and beverage producers and bottlers have need for the product at their plant, not miles away. A cogeneration/carbon dioxide production facility would give them cheaper electric power and very inexpensive carbon dioxide, on site and under their control. An existing power plant at one of these facilities can be modified to accomplish the same result.

The economic feasibility of the present invention is predicted upon the need or sale of carbon dioxide from the now wasted exhaust of a cogeneration installation. If the cogeneration plant is economically justified because of the electric power costs alone, then the use or sale of the carbon dioxide, recovered by this invention will make the installation more profitable. The magnitude of the economic advantage has been calculated to reduce the pay back time period of a cogeneration installation to one third or less and after pay back to increase the plant's profits over fourfold.

It now will be recognized that the present invention has the advantages of installation at user's location, highly efficient solvent, minimum corrosion resulting in less expensive materials, smaller plant size because of solvent carrying capacity and oxygen tolerance, skid mounted plant for ease of movement to new location, reduction in atmospheric pollution, lower operating costs and energy requirements, elimination of $CO_2$ transportation equipment and charges, qualification as a cogeneration plant under PURPA and lower $CO_2$ costs. Since certain changes or modifications may be made in the disclosed embodiments without departing from the inventive concepts involved, it is the aim of the appended claims to cover all such changes and modifications falling within the true spirit and scope of the present invention.

What is claimed is:

1. A method of generating electric power in a manner that qualifies as a cogeneration facility and producing carbons dioxide ($CO_2$) from exhaust gases, comprising the steps of: driving an electric generator with a prime mover that burns a mixture of fossil fuel and an oxygen-containing gas such as air and produces hot exhaust gases; passing said hot exhaust gases through a waste heat recovery unit to recover thermal energy; directing cooled exhaust gases coming out of said waste heat recovery unit to a $CO_2$ recovery unit; processing said cooled exhaust gases in said recovery unit to extract $CO_2$ from said exhaust gases; and using said recovered thermal energy in said processing step.

2. The method of claim 1 including the further step of using a booster fan to direct said cool exhaust gases to said $CO_2$ recovery unit.

3. The method of claim 2 wherein said processing includes absorbing $CO_2$ in said cool exhaust gases in a recovery solution contained in said $CO_2$ recovery unit; conveying said solution to a separator; and separating the $CO_2$ from said solution and piping said $CO_2$ in gaseous form to a utilization means.

4. The method of claim 3 including the further steps of: returning said solution to said $CO_2$ recovery unit; and venting gas from said separator containing principally oxygen, nitrogen and water vapor to the atmosphere.

5. The method of claim 4 including the further steps of: feeding the water saturated, relatively pure, gaseous stream of $CO_2$ coming out of said separator to a liquification plant; and drying, compressing and liquifying said $CO_2$ stream.

6. The method of claim 5 including the further step of: storing liquid $CO_2$ in a storage tank.

7. The method of claim 5 including the further step of: pumping said liquified $CO_2$ into a pipe line for delivery to an injection system of an oil well associated with an enhanced oil recovery program in an oil field.

8. The method of claim 5 including the further step of: processing the liquid $CO_2$ to produce dry ice.

9. The method of claim 5 including the further step of: using said liquified $CO_2$ in a beverage bottling process or food processing facility.

10. The method of claim 1 including the further steps of: using a portion of the electrical output of said generator to power equipment associated with said $CO_2$ recovery unit; and selling the balance of the electrical output of said generator to a public utility.

11. A carbon dioxide ($CO_2$) production and cogeneration facility comprising: a prime mover of the type requiring a mixture of fossil fuel and air for internal combustion that produces hot exhaust gases, said prime mover having lubricating oil, a cooling jacket containing a cooling fluid, and an exhaust gas manifold; heat exchangers for the recovery of rejected heat from said lubricating oil, said cooling jacket fluid, and said manifold to recover thermal energy; an electric generator driven by said prime mover for producing electric power; a $CO_2$ recovery unit for removing the $CO_2$ component of said exhaust gases; means for directing cooled exhaust gases coming out of said manifold to said $CO_2$ recovery unit; and means for using said recovered thermal energy in said $CO_2$ recovery unit.

12. The facility of claim 11 further including fan means for forcing said cool exhaust gases toward said $CO_2$ recovery unit.

13. The facility of claim 12 wherein said $CO_2$ recovery unit comprises a vessel containing a co-solvent recovery solution, said cool exhaust gases being in countercurrent contact with said solution where $CO_2$ is absorbed therein.

14. The facility of claim 13 further including separator means through which said recovery solution is circulated for removing the $CO_2$ from said solution.

15. The facility of claim 14 further including liquification means for converted gaseous $CO_2$ taken from said separator means to liquid form to enable storage thereof.

16. The facility of claim 11 further including means for the reduction of undesirable substances from said hot exhaust gases, said substances including certain oxides of carbon, nitrogen and sulfur.

17. The facility of claim 11 further including switch gear and transformer means associated with said generator means for selectively connecting the electrical output of said generator means with the transmission lines of a public utility.

18. A portable trigeneration plant comprising: a prime mover that burns a mixture of hydrocarbon fuel and oxygen-containing gas and produces an exhaust; an electric generator driven by said prime mover for producing electric power; means for recovering waste heat from said prime mover exhaust; means for providing a supplemental firing of said exhaust to reduce its oxygen content, produce more thermal energy and increase the concentration of carbon dioxide therein; means associated with said waste heat recovering means for producing steam for driving a steam turbine which drives an electric generator to produce additional electric power; means for routing said exhaust to a carbon dioxide stripper; absorber means for contacting said exhaust with a solvent that removes carbon dioxide from solution; means for processing said carbon dioxide to a usable state; and means for using said recovered waste heat in the recovery of the carbon dioxide.

19. The plant of claim 18 wherein said processing means includes scrubbing means to remove impurities, drying means, and cooling means to convert said carbon dioxide to a liquid phase.

20. The plant of claim 18 wherein said processing means includes compressor means and cooling means to condition said carbon dioxide for injection into a pipeline.

21. The plant of claim 18 wherein plant is mounted on skids so as to be easily located and moved.

22. The plant of claim 18 further including incinerator means for disposing of waste solvent products by periodically burning the same.

23. A carbon dioxide production and cogeneration facility comprising:
   a prime mover of the type requiring a mixture of fossil fuel and an oxygen-containing gas to produce internal combustion, said prime mover having lubricating oil, a cooling jacket containing a cooling liquid, and an exhaust gas manifold that receives hot exhaust gases formed by said combustion;
   an electric generator driven by said prime mover for producing electric power;
   a heat recovery unit adapted to recover rejected heat from said hot exhaust gases to produce a cooled exhaust gas stream;
   a carbon dioxide recovery unit including an absorber that utilizes a solvent solution to absorb carbon dioxide contained in said cooled exhaust gas stream, a carbon dioxide stripper for removing the carbon dioxide from said solvent solution, and a reboiler for heating said solvent solution to enrich the carbon dioxide content thereof;
   first routing means for directing said cooled exhaust gas stream to said carbon dioxide recovery unit; and
   second routing means for directing heat recovered by said heat recovery unit to said reboiler.

24. The facility of claim 23 wherein said prime mover comprises a gas turbine, and further including means for producing steam at said waste recovery unit for supply to said reboiler.

25. A facility of claim 23 wherein said waste heat recovery unit and said carbon dioxide recovery unit are portable so as to be readily transported from one power generation site to another power generation site.

26. A method of generating electric power in a manner that qualifies as a cogeneration facility and of producing carbon dioxide from exhaust gases, comprising the steps of:
   driving an electric generator with a prime mover that burns a mixture of fossil fuel and oxygen-containing gas and produces hot exhaust gases;
   passing said hot exhaust gases through a waste heat recovery unit to recover thermal energy;
   directing cooled exhaust gases coming out of said waste heat recovery unit to a carbon dioxide recovery unit including a first absorber, a carbon dioxide stripper, and a reboiler for said stripper;
   providing a solvent solution to absorb carbon dioxide from said cooled exhaust gases passing through said first absorber;
   routing the solvent solution to said stripper for removal of the carbon dioxide component from the solvent solution;
   transferring the heat recovered at said recovery unit to a transfer fluid, and
   separately routing the heat transfer fluid to said reboiler to cause heating of said solvent solution to thereby enrich the carbon dioxide content of said solvent solution.

27. The method of claim 26 including the additional step of: recovering heat at said heat recovery unit in the form of steam for processing use and utility use.

28. The method of claim 27 including the further steps of:
   using said steam to drive a steam turbine which produces additional electric power, and using said steam to operate said reboiler.

29. A method of generating electric power in a manner that qualifies as a cogeneration facility and producing carbon dioxide ($CO_2$) from exhaust gases, comprising the steps of: driving an electric generator with a prime mover that burns a mixture of fossil fuel and an oxygen containing gas such as air and produces hot exhaust gases; passing said hot exhaust gases through a waste heat recovery unit to recover thermal energy; directing cooled exhaust gases coming out of said waste heat recovery unit to a $CO_2$ recovery unit; processing said cooled exhaust gases in said recovery unit to extract $CO_2$ from said exhaust gases; and using said recovered thermal energy in said processing step.

* * * * *

REEXAMINATION CERTIFICATE (2906th)
United States Patent [19]
Boyd

[11] B1 4,899,544
[45] Certificate Issued Jun. 11, 1996

[54] COGENERATION/CO₂ PRODUCTION PROCESS AND PLANT

[75] Inventor: Randall T. Boyd, Sugarland, Tex.

[73] Assignee: Neco Licensing Company, Sugarland, Tex.

Reexamination Requests:
No. 90/002,230, Dec. 14, 1990
No. 90/002,618, Jan. 21, 1992
No. 90/003,199, Sep. 20, 1993

Reexamination Certificate for:
Patent No.: 4,899,544
Issued: Feb. 13, 1990
Appl. No.: 355,894
Filed: May 19, 1989

[51] Int. Cl.⁶ .................................... F01K 23/10
[52] U.S. Cl. ............................ 60/618; 60/721
[58] Field of Search ................. 60/39.182, 618, 60/616, 648, 649, 670, 721

[56] References Cited

U.S. PATENT DOCUMENTS

| | | |
|---|---|---|
| 2,593,530 | 4/1952 | Bridges . |
| 4,364,915 | 12/1982 | Proctor ................................ 423/437 |
| 4,566,278 | 1/1986 | Force ................................ 60/618 |
| 4,977,745 | 12/1990 | Heichberger ........................... 62/10 |
| 5,729,879 | 3/1988 | Black . |

*Primary Examiner*—Stephen F. Husar

[57] ABSTRACT

In accordance with an illustrative embodiment of the present invention, a cogeneration facility combined with means for producing $CO_2$ includes an internal combustion engine that drives an electrical generator, a waste heat recovery unit through which hot exhaust gases from the engine are passed to recover thermal energy in usable form, and means for conveying exhaust gases coming out of the waste heat recovery unit to a $CO_2$ recovery unit where the $CO_2$ is extracted and made available as a saleable byproduct.

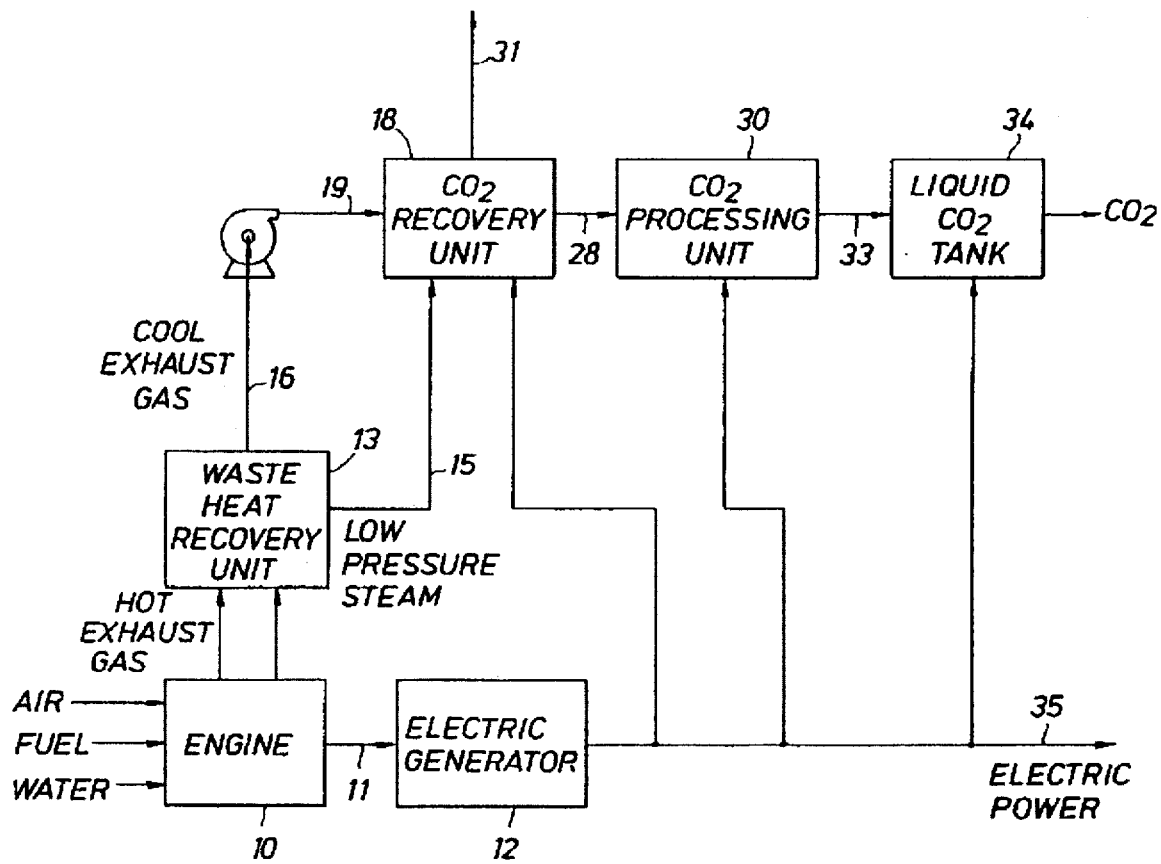

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–29 are cancelled.

Claims 30–49 are added and determined to be patentable.

30. *A method of generating electric power in a manner that qualifies as a cogeneration facility and producing carbon dioxide ($CO_2$) from exhaust gases, comprising the steps of: driving an electric generator with a prime mover that burns a mixture of fossil fuel and an oxygen containing gas such as air and produces hot exhaust gases; directing said hot exhaust gases to functionally separate and independent waste heat recovery unit that recovers heat from said exhaust gases and produces steam without the addition of any supplement heat; after the exhaust gases have been cooled in said heat recovery unit, conveying the said cooled exhaust gases to a $CO_2$ recovery facility which includes an absorber and a stripper; using an absorbent in said absorber to absorb the $CO_2$ in said exhaust gases; passing said absorbent to said stripper where $CO_2$ is extracted; and using said steam to provide heat that is utilized for the extraction of $CO_2$ in said stripper.*

31. *The method of claim 1 including the further step of using a booster fan to direct said cool exhaust gases to said $CO_2$ recovery unit.*

32. *The method of claim 31 wherein said processing includes absorbing $CO_2$ in said cool exhaust gases in a recovery solution contained in said $CO_2$ recovery unit; conveying said solution to a separator; and separating the $CO_2$ from said solution and piping said $CO_2$ in gaseous form to a utilization means.*

33. *The method of claim 32 including the further steps of: returning said solution to said $CO_2$ recovery unit; and venting gas from said separator containing principally oxygen, nitrogen and water vapor to the atmosphere.*

34. *The method of claim 33 including the further steps of: feeding the water saturated, relatively pure, gaseous stream of $CO_2$ coming out of said separator to a liquification plant; and drying, compressing and liquidifying said $CO_2$ stream.*

35. *The method of claim 34 including the further step of storing liquid $CO_2$ in a storage tank.*

36. *The method of claim 34 including the further step of: pumping said liquified $CO_2$ into a pipe line for delivery to an injection system of an oil well associated with an enhanced oil recovery program in an oil field.*

37. *The method of claim 34 including the further step of: processing the liquid $CO_2$ to produce dry ice.*

38. *The method of claim 34 including the further step of: using said liquified $CO_2$ in a beverage bottling process or food processing facility.*

39. *The method of claim 30 including the further steps of: using a portion of the electrical output of said generator to power equipment assocated with said $CO_2$ recovery unit; and selling the balance of the electrical output of said generator to a public utility.*

40. *A portable trigeneration plant comprising: a prime mover that burns a mixture of hydrocarbon fuel and oxygen-containing gas and produces an exhaust; a first electric generator driven by said prime mover for producing electric power; functionally separate and independent means for recovering waste heat from said prime mover exhaust; means for providing supplemental firing of said exhaust to reduce its oxygen content, produce more thermal energy and increase the concentration of carbon dioxide therein; means associated with said waste heat recovering means for producing steam and for using a first portion of said steam to drive a steam turbine which drives a second electric generator to produce additional electric power; means for routing said exhaust to a carbon dioxide stripper; absorber means for contacting said exhaust with a solvent that removes carbon dioxide from solution; means for processing said carbon dioxide to a usable state; and means for using a second portion of said steam in the recovery of carbon dioxide in said stripper.*

41. *The plant of claim 40 wherein said processing means includes scrubbing means to remove impurities, drying means, and cooling means to convent said carbon dioxide to a liquid phase.*

42. *The plant of claim 40 wherein said processing means includes compressor means and cooling means to condition said carbon dioxide for injection into a pipeline.*

43. *The plant of claim 40 wherein plant is mounted on skids so as to be easily located and moved.*

44. *The plant of claim 40 further including incinerator means for disposing of waste solvent products by periodically burning the same.*

45. *A carbon dioxide production and qualified cogeneration facility comprising: a prime mover of the type requiring a mixture of fossil fuel and an oxygen-containing gas to produce internal combustion, said prime mover having lubricating oil, a cooling jacket containing a cooling liquid, and an exhaust gas manifold that receives hot exhaust gases formed by said combustion; an electric generator driven by said prime mover for producing electric power; a functionally separate and independent heat recovery unit adapted to recover rejected heat from said hot exhaust gases to produce a cooled exhaust gas stream, said recovery unit being operable without the addition of any supplemental heat; a carbon dioxide recovery unit including an absorber that utilizes a solvent solution to absorb carbon dioxide in said cooled exhaust gas stream, a carbon dioxide stripper for removing the carbon dioxide from said solvent solution, and a reboiler for heating said solvent solution to separate carbon dioxide from said solution to enrich the carbon dioxide content thereof; first routing means for directing said cooled exhaust gas stream to said carbon dioxide recovery unit; and second routing means for directing heat recovered by said heat recovery unit to said reboiler.*

46. *A facility of claim 45 wherein said waste heat recovery unit and said carbon dioxide recovery unit are portable so as to be readily transported from one power generation site to another power generation site.*

47. *A method of generating electric power in a manner that qualifies as a cogeneration facility and of producing carbon dioxide from exhaust gases, comprising the steps of: driving an electric generator with a prime mover that burns a mixture of fossil fuel and oxygen-containing gas and produces hot exhaust gases; passing said hot exhaust gases through a waste heat recovery unit to effect a recovery of thermal energy from said exhaust gases without the addition* of any supplemental heat; directing cooled exhaust gases coming out of said waste heat recovery unit to a carbon dioxide recovery unit including a first absorber, a carbon dioxide stripper, and a reboiler for said stripper, providing a solvent solution to absorb carbon dioxide from said cooled exhaust gases passing through said first absorber; routing the solvent solution to said stripper for removal of the carbon dioxide component from the solvent solution; transferring the heat recovered at said recovery unit to steam, using said steam to drive a steam turbine to produce additional electric power; and separately routing the steam to said reboiler to cause heating of said solvent solution to thereby enrich carbon dioxide content of said solvent solution.

48. A method of generating electric power in a manner that qualifies as a cogeneration facility and of producing carbon dioxide from exhaust gases, comprising the steps of: driving a first electric generator with an internal combustion prime mover that burns a mixture of fossil fuel and oxygen-containing gas and produces hot exhaust gases; passing said hot exhaust gases through a waste heat recovery unit to recover thermal energy; directing cooled exhaust gases coming out of said waste heat recovery unit to a carbon dioxide recovery unit including a first absorber, a carbon dioxide stripper, and a reboiler for said stripper; routing cooled exhaust gases from said heat recovery unit to said first absorber; providing a solvent solution to absorb carbon dioxide from said cooled exhaust gases passing through said first absorber; routing the solvent solution to said stripper for removal of the carbon dioxide component from the solvent solution; transferring the heat recovered at said recovery unit to produce steam without any supplemental firing; directing the steam produced by said recovery unit to a steam turbine to operate the same; driving a second electric generator from said steam turbine; and separately routing at least a portion of the steam from said steam turbine to said reboiler to cause heating of said solvent solution to thereby enrich the carbon dioxide content of such solvent solution in connection with recovery of the carbon dioxide content of said solvent solution.

49. The method as set forth in claim 48 wherein said step of driving a first electric generator is provided by a gas turbine.

* * * * *